United States Patent
Wang

(10) Patent No.: US 10,076,871 B2
(45) Date of Patent: Sep. 18, 2018

(54) SYSTEMS AND METHODS FOR IMPROVED ULTRASONIC WELDING USING ENERGY-DIRECTOR-LOCATING ALGORITHM

(71) Applicant: GM GLOBAL TECHNOLOGY OPERATIONS LLC, Detroit, MI (US)

(72) Inventor: Pei-Chung Wang, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 791 days.

(21) Appl. No.: 14/453,742

(22) Filed: Aug. 7, 2014

(65) Prior Publication Data
US 2015/0041047 A1    Feb. 12, 2015

Related U.S. Application Data

(60) Provisional application No. 61/863,566, filed on Aug. 8, 2013.

(51) Int. Cl.
*B29C 65/00*    (2006.01)
*B23K 20/00*    (2006.01)
(Continued)

(52) U.S. Cl.
CPC .............. *B29C 65/08* (2013.01); *B23K 20/10* (2013.01); *B29C 65/7802* (2013.01);
(Continued)

(58) Field of Classification Search
CPC ......... B29C 65/00; B29C 65/08; B29C 65/70; B29C 65/78; B29C 65/78; B29C 65/78;
(Continued)

(56) References Cited

U.S. PATENT DOCUMENTS

| | | | | |
|---|---|---|---|---|
| 4,631,685 A | * | 12/1986 | Peter | B29C 65/08 156/350 |
| 2009/0188966 A1 | * | 7/2009 | Klinstein | B29C 65/08 228/102 |
| 2014/0078711 A1 | * | 3/2014 | Bolanos | B23K 20/10 361/820 |

FOREIGN PATENT DOCUMENTS

DE  4321874  1/1995
EP  0076135  4/1983

OTHER PUBLICATIONS

Office Action in related German application dated Oct. 4, 2017.

* cited by examiner

*Primary Examiner* — Jacob T Minskey
*Assistant Examiner* — Matthew Hoover
(74) *Attorney, Agent, or Firm* — Cynthia R. Parks; Parks IP Law LLP

(57) ABSTRACT

A process, for locating a welding energy director, for effective welding together of multiple workpieces at an area of the director. The director includes positioning a workpiece arrangement in preparation to make approaches, for locating the director, wherein the workpiece arrangement includes a proximate workpiece of the multiple workpieces, a distal workpiece, and the welding director positioned therebetween. The process also includes performing a sub-routine comprising moving a locating implement toward the proximate workpiece. The routine also includes determining whether a push-back force, being received at the locating implement from the workpiece, indicates that the locating implement has been lowered to a local terminal point. The routine includes relocating, in response to a negative result, the implement for repeating until a positive result, and determining, in response to the positive results in the loca-
(Continued)

tion determination, that the director is located directly beneath an area corresponding to the positive result.

19 Claims, 5 Drawing Sheets

(51) Int. Cl.
B29C 65/08 (2006.01)
B23K 20/10 (2006.01)
B29C 65/78 (2006.01)
B29K 105/26 (2006.01)

(52) U.S. Cl.
CPC ...... *B29C 66/1122* (2013.01); *B29C 66/3024* (2013.01); *B29C 66/43* (2013.01); *B29C 66/83221* (2013.01); *B29C 66/9261* (2013.01); *B29C 66/9292* (2013.01); *B29C 66/92211* (2013.01); *B29C 66/95* (2013.01); *B29C 66/961* (2013.01); *B29C 66/71* (2013.01); *B29C 66/712* (2013.01); *B29C 66/721* (2013.01); *B29C 66/7212* (2013.01); *B29C 66/742* (2013.01); *B29C 66/7422* (2013.01); *B29C 66/74283* (2013.01); *B29C 66/8246* (2013.01); *B29C 66/863* (2013.01); *B29C 66/9672* (2013.01); *B29C 66/9674* (2013.01); *B29K 2105/26* (2013.01); *B29K 2995/0056* (2013.01)

(58) Field of Classification Search
CPC ..... B29C 65/7802; B29C 66/00; B29C 66/10; B29C 66/11; B29C 66/11; B29C 66/112; B29C 66/112; B29C 66/1122; B29C 66/30; B29C 66/30; B29C 66/302; B29C 66/302; B29C 66/3024; B29C 66/40; B29C 66/43; B29C 66/80; B29C 66/83; B29C 66/83; B29C 66/832; B29C 66/832; B29C 66/8322; B29C 66/8322; B29C 66/38221; B29C 66/90; B29C 66/92; B29C 66/92; B29C 66/922; B29C 66/922; B29C 66/9221; B29C 66/9221; B29C 66/92211; B29C 66/926; B29C 66/926; B29C 66/929; B29C 66/9292; B29C 66/95; B29C 66/96; B29C 66/96; B29C 66/961; B23K 20/00; B23K 20/10
See application file for complete search history.

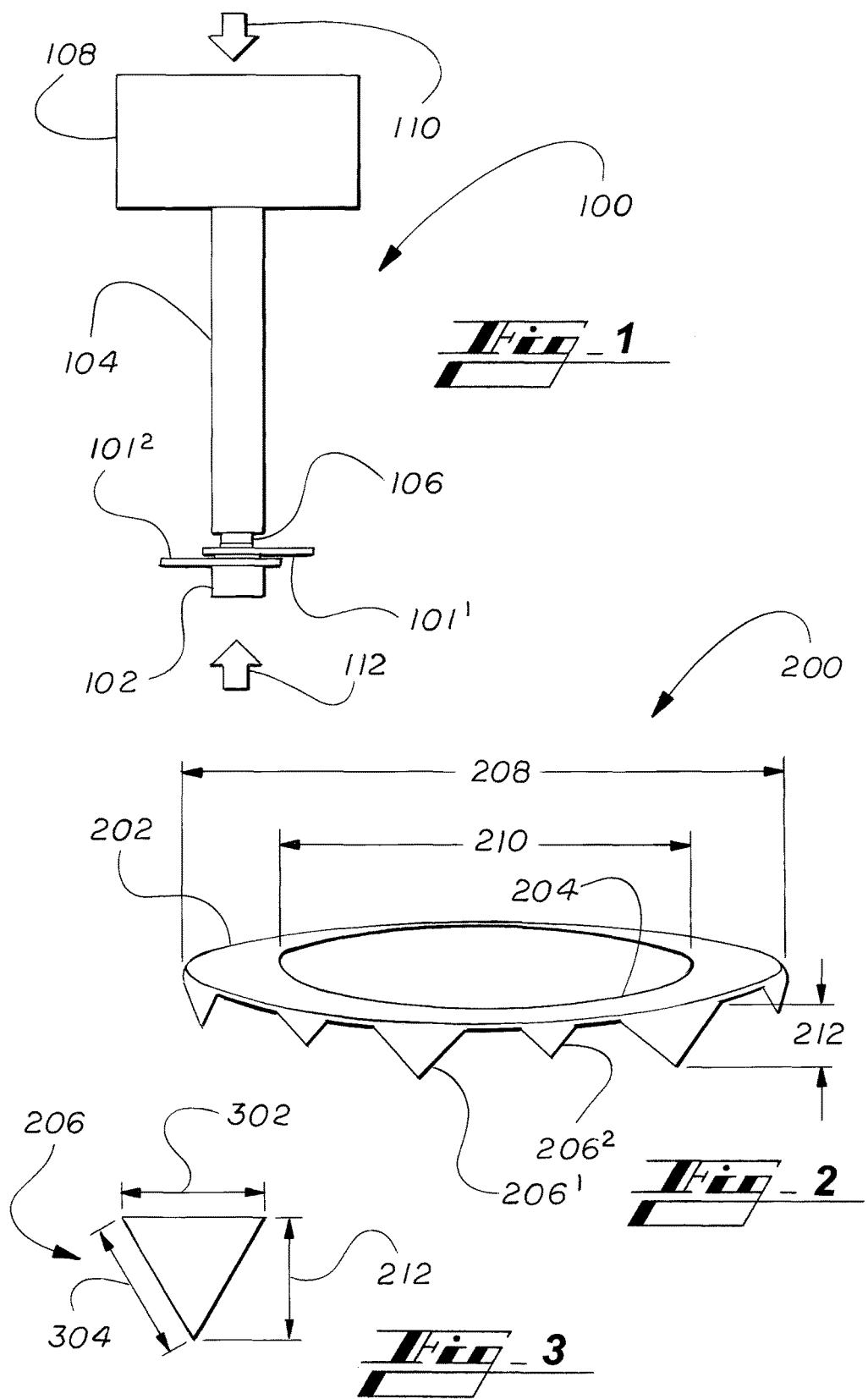

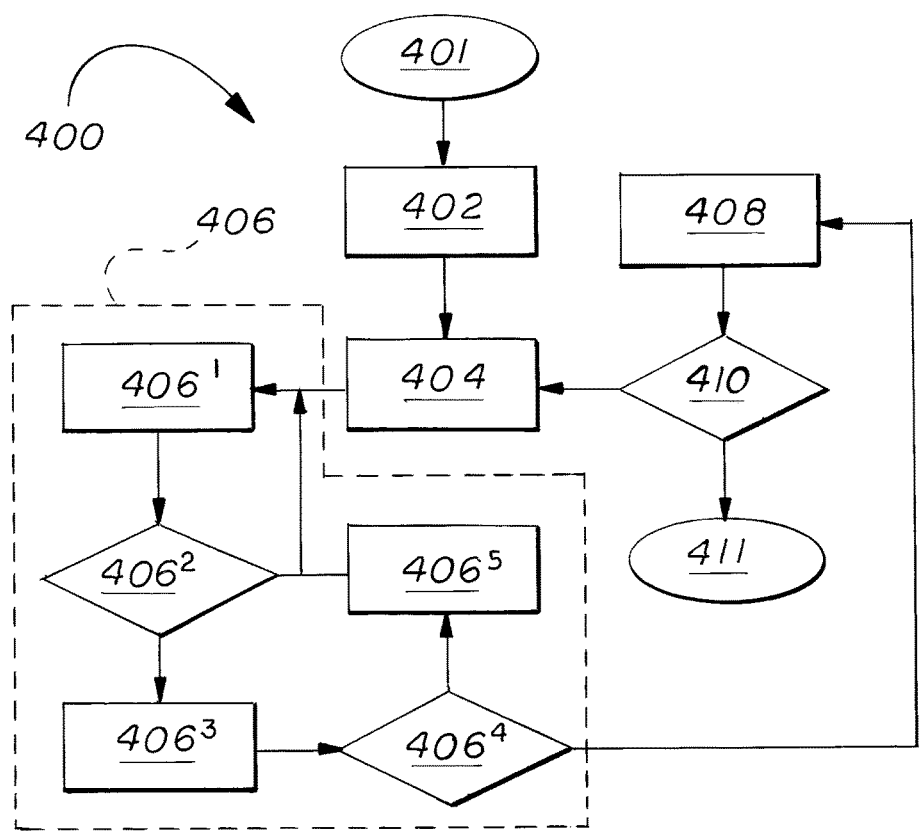
Fig_4
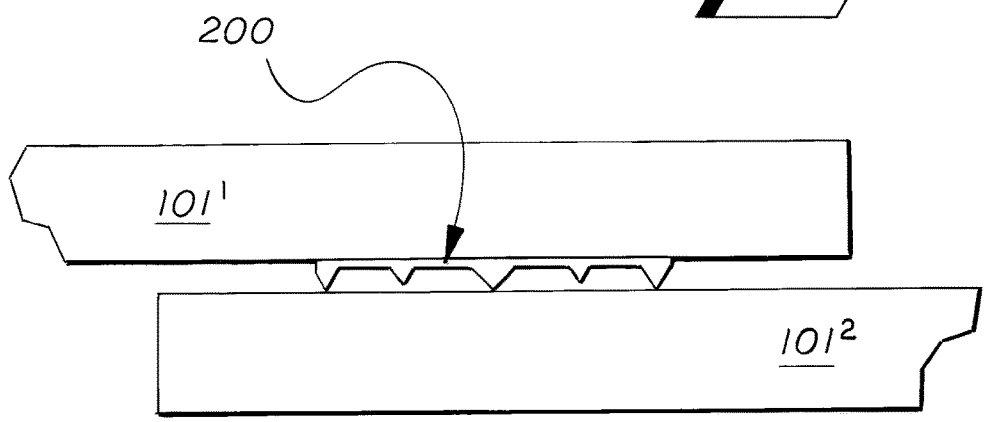
Fig_5

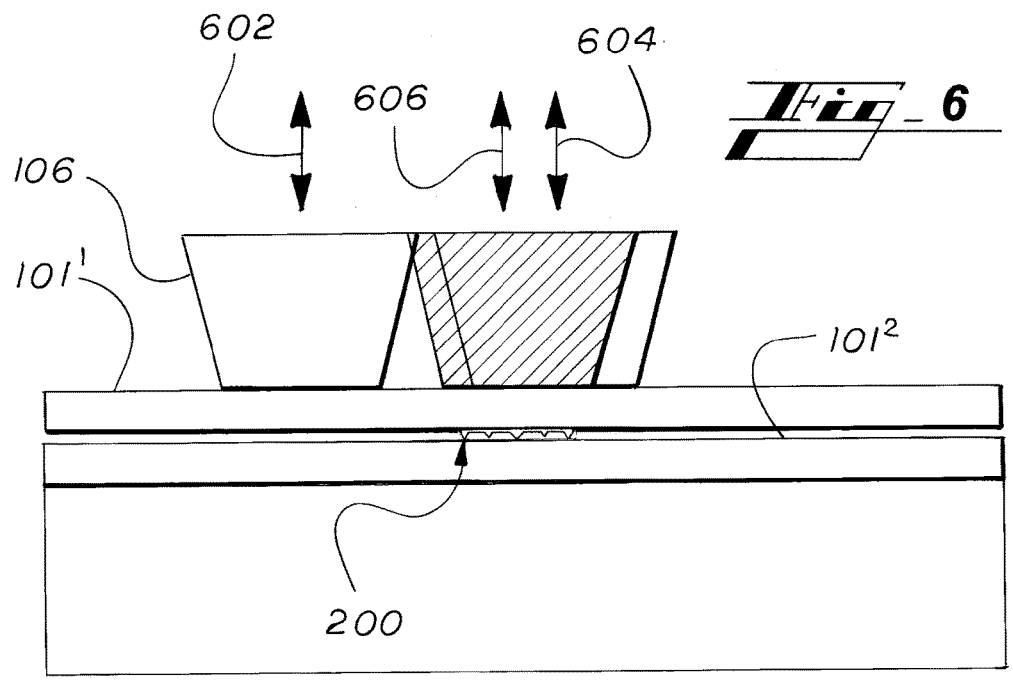
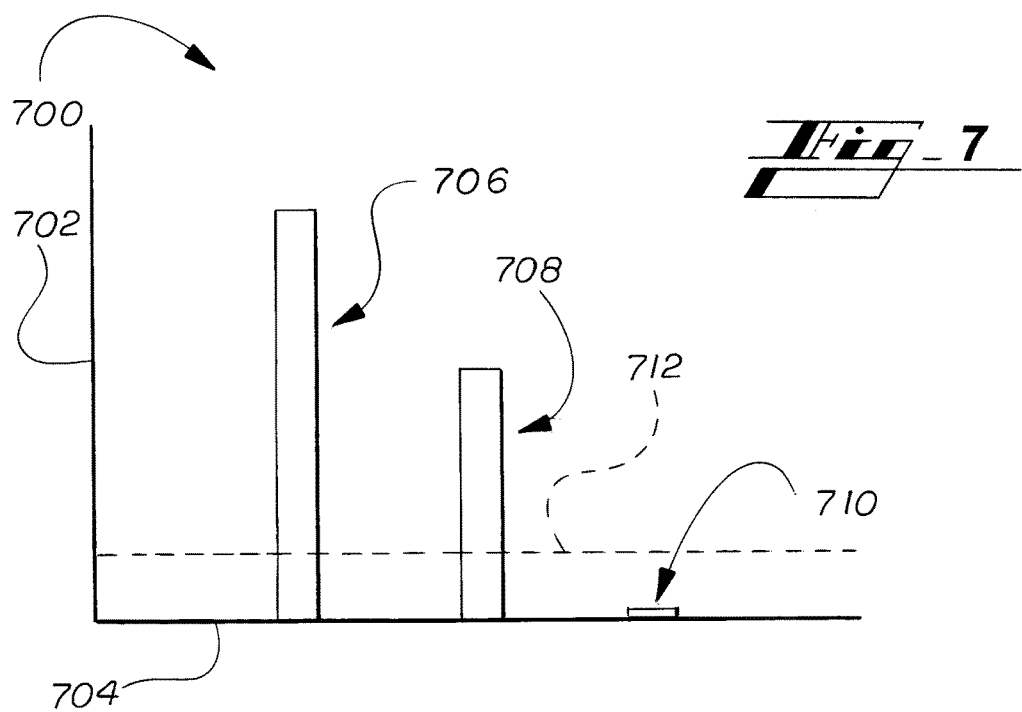

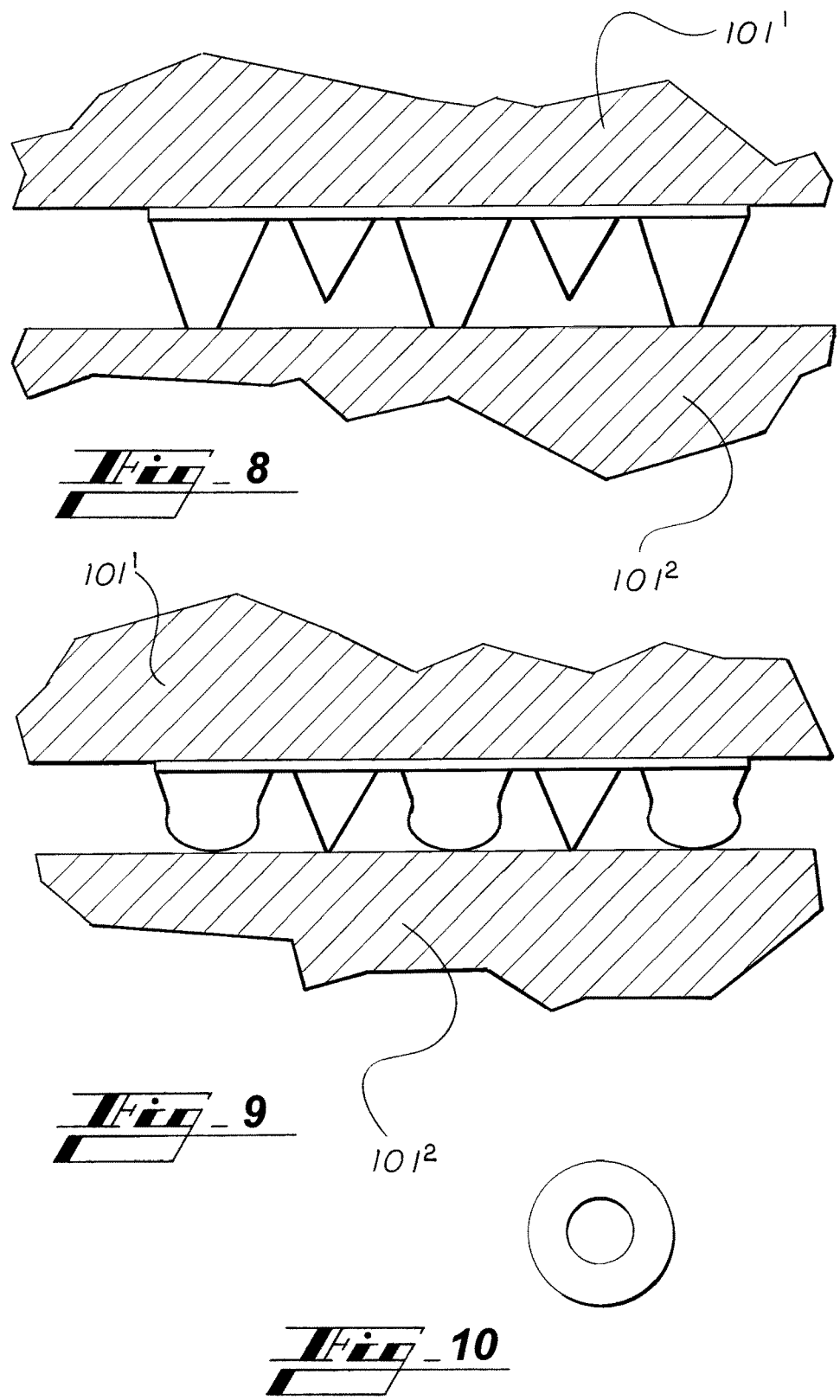

SYSTEMS AND METHODS FOR IMPROVED ULTRASONIC WELDING USING ENERGY-DIRECTOR-LOCATING ALGORITHM

TECHNICAL FIELD

The present disclosure relates generally to an improved technique for welding together multiple workpieces and, more particularly, to systems and methods for improved ultrasonic welding, using an algorithm for locating welding energy directors.

BACKGROUND

In automotive manufacturing, polymetric composites are being used increasingly due to their favorable characteristics, such as being lightweight, highly-conformable or shapeable, strong, and durable. Some composites are further colorable and can be finished to have most any desired texture.

The increased use in automobiles includes, for instance, in instrument and door panels, lamps, air ducts, steering wheels, upholstery, truck beds or other vehicle storage compartments, upholstery, external parts, and even engine components. Regarding engine components, and other under-the-hood (or, UTH) applications, for instance, polymers are configured, and being developed continuously, that can withstand a hot and/or chemically aggressive environment. Regarding external parts, such as fenders, polymers are being developed that are online paintability and have high heat and chemical resistance over longer periods of time. And many other potential usages in automotive applications are being considered continuously.

With the increased use of polymers and other low-mass materials, compression molding and post-mold joining techniques—e.g., ultrasonic welding—are also being used more commonly.

Because some materials being used increasingly, including polymer composites, have relatively low melting points, a challenge arises in efforts to melt the parts at an interface joining the parts quickly and with minimal melting of other portions of the workpieces.

Energy directors are sometimes used to expedite and control welding. Multiple challenges arise. One is that because the energy directors are usually not visible at the time for welding, it is difficult for the welder, attempting to focus welding at the director, to determine exactly where that is. The directors currently cannot be located with accuracy, or are located—i.e., manually, by eye and hand— with much additional work and time.

The increased time and energy requirements are cost prohibitive, especially when multiplied by repeated iterations processing in a manufacturing environment—e.g., automobile assembly plant.

SUMMARY

The present technology relates to systems and methods for improved ultrasonic welding using an algorithm for locating, automatically, energy-directing devices during the welding.

The algorithm outlines a sub-process by which locations of energy-directing devices, or energy directors, are identified. The locations are determined based on a displacement traveled by the welding horn, being controlled to move in a pre-determined manner toward the workpieces between which the device sits, to a point at which the horn is opposed by a threshold return force from the proximate workpiece.

Other aspects of the present invention will be in part apparent and in part pointed out hereinafter.

DESCRIPTION OF THE DRAWINGS

FIG. 1 illustrates a two-sided ultrasound system.

FIG. 2 illustrates an example multi-height energy director, according to an embodiment of the present technology.

FIG. 3 illustrates a leg, or protrusion, of the multi-height energy director of FIG. 2.

FIG. 4 illustrates a method for locating an energy director, such as the multi-height energy director of FIG. 2, positioned between workpieces to be welded together, and performing the welding to join the pieces.

FIG. 5 illustrates a side view of the multi-height energy director of FIG. 2 positioned between the workpieces.

FIG. 6 illustrates welding-tool positions occasioned in locating the workpiece according to example scenarios.

FIG. 7 shows a graph comparing welding-tool displacement in an application direction (e.g., vertical) an orthogonal tool position (e.g., lateral location over the workpiece).

FIG. 8 illustrates the multi-height energy director of FIG. 2 at an interim stage of welding, before a second level of the director contacts the second workpiece.

FIG. 9 illustrates the multi-height energy director of FIG. 2 at a subsequent interim stage of welding, at which the second level of the director first contacts the second workpiece.

FIG. 10 illustrates an example weld formed using the energy director of FIG. 2.

DETAILED DESCRIPTION

Figure 11:
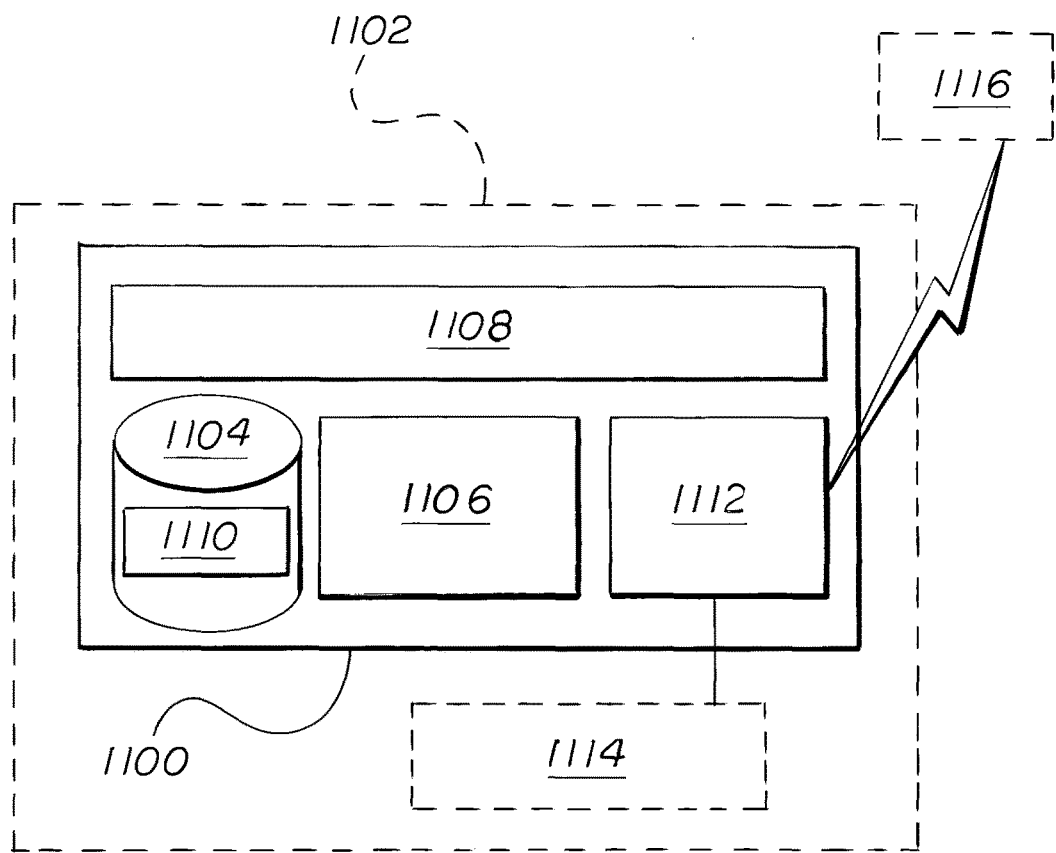
FIG. 11 illustrates an example controller, for use in performing operations of the method of FIG. 4.

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the technology foci (e.g., claims), listed below, and as a representative basis for teaching one skilled in the art to variously employ the present disclosure.

While the description includes a general context of computer-executable instructions, the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including single-processor or multiprocessor systems, microprocessor-based electronics, combinations thereof, and the like.

I. GENERAL OVERVIEW OF THE DISCLOSURE

The present disclosure describes an ultrasonic welding technique for joining workpieces, such as polymeric composites.

One aspect of the disclosure relates to systems and methods for improved ultrasonic welding. The system includes an algorithm (e.g., computer-readable code) configured for controlling apparatus elements for locating the multi-height energy-directing device for welding at the identified location. The location is determined based on a displacement traveled by a welding head, tip, or horn, such as an ultrasound servo horn, being controlled to move in a pre-determined manner toward the workpieces between which the device sits, to a point at which the horn is opposed by a threshold return force from the proximate workpiece.

More specifically, the welding tool is lowered onto a proximate workpiece, of the two workpieces being joined, and between which the energy director sits.

As the welding horn is controlled to lower onto the workpiece, a controller receives feedback indicating force, or resistance, countering the downward motion. According to the algorithm, e.g., computer-executable instructions, the controller determines, based on a distance traveled by the horn prior to the horn being opposed by a predetermined threshold force.

If the distance traveled indicates that the horn is not directly over a location of the workpiece having the energy directory directly below, the controller controls the welding horn to move to another location, preferably closer to the director center, based on the last measurements, and the descending and measuring are re-performed at the new position.

If the distance traveled indicates that the horn is directly over a location of the workpiece having the energy directory directly below, welding is performed. The welding is performed advantageously for many reasons related to the multi-height director configuration of the present technology.

The system components, algorithm, and operations are described further below with reference to FIGS. 1-9.

II. PROCESS, SYSTEM TOOLING, AND WORKPIECES—FIGS. 1-11

The present technology is now described with reference to example systems, tooling, and workpieces. The figures are referenced to facilitate understanding of the technology, and not to limit scope thereof.

Reference to directions herein, such as upper, lower, up, down, and lateral, are provided to facilitate description of the present technology but does not limit scope of the technology. A description in which a servo horn is described as descending down upon a proximate workpiece is not limited, for example, to the horn moving vertically downward in the earth, or environment, frame. The horn in this case can be moving from left to right, for example, in the environment frame.

II.A. General Welding System—FIG. 1

Now turning to the figures, and more particularly, the first figure, FIG. 1 shows an example welding system, indicated generally by reference numeral 100. The system 100 is used to weld together two workpieces 101[1], 101[2].

The system 100 includes a supporting, or under, structure 102. The system also includes a welding arm 104 terminating in a welding energy application tip, or horn 106. The horn can include, for instance, an ultrasonic servo horn, configured to apply energy, in the form of high-frequency vibrations, to the workpieces for welding them together.

The welding arm 104 extends from a second, or application-side, structure, or mass 108.

In operation, an application-direction force 110 can be applied by and/or at the mass 108. The force 110 pushes the arm 104 and horn 106 toward the workpieces 101 being welded together. A counterpart force 112 pushes the supporting structure 102 toward the workpieces. With the mass and application-direction force pushing toward the workpieces 101 from a first, application, direction, and the counter force 112 pushing toward the pieces 101 from an opposite direction, the workpieces 101 are kept at a desired compression during welding.

II.B. Multi-Height Energy-Directing Device—FIGS. 2 and 3

FIG. 2 shows an energy-directing device, or energy director 200.

The energy director 200 can include any material described herein, including in connection with the workpieces.

In one embodiment, the energy director 200 is generally annular—e.g., has a generally annular, or ring-like, plan-view (e.g., top) profile. With reference to the figure, an upper portion of the annular configuration is identified by reference numeral 202.

Importantly, it has been found that an annular weld can be as strong as continuous welds (i.e., welds not having a central void)—in one present finding, this is especially true when a ratio of an internal diameter to an external diameter is less than about 0.6. More specifically, under an applied tensile load, a predominant amount of the holding force created by a solid or continuous weld is provided by an outer annual portion of the weld, with a central portion of the weld contributing little holding force in comparison. A weld lacking the central portion, thus, can be formed with less energy than a continuous weld (one lacking a central void), and perhaps less time, without sacrificing joint strength.

While the energy director 206, whether annular or other shape, can have other widths 208 without departing from the scope of the present technology, in one embodiment each director has a width 208 (e.g., diameter, or maximum width) between about 3 mm and about 20 mm. In one embodiment, the width 208 can be smaller, such as down to about 1 mm, and still possibly up to about 20 mm.

The upper portion 202 defines a central hole, or void 204. While the void 204, whether circular, oval, rectangular, or other, can have other internal widths 210 without departing from the scope of the present technology, in one embodiment each director 200 has one or more internal widths 210 between about 1.5 mm and about 12 mm. In one embodiment, the internal width 208 can be smaller, such as down to about 0.6 mm, and still possibly up to about 12 mm, for instance.

While the illustrated director 200 has a generally annular plan, or top, profile shape, the director can have other plan profile shapes. Other example shapes include oval, square, or other rectangular shapes, with a central void.

The energy director 200 includes a plurality of energy-director (ED) elements 206. The elements may be referred to by other names such as a height-control ED element, protrusion, or ridge, or an elevation-control element, protrusion, or ridge.

The ED elements 206 extend, or protrude (e.g., protrude downward), from the upper portion 202 of the director 200, such as shown in FIG. 2. In one embodiment, the ED 200 is formed during compression molding of one of the workpieces (e.g., proximate workpiece $101^1$), and so is a contiguous part of that workpiece.

While the ED element 206 can have other shapes, in the illustrated embodiment, each director has a generally triangular side profile. Other example shapes include square, otherwise rectangular, or rounded—e.g., semi-circle or ovular.

In the illustrated embodiment, each ED element 206 includes an upper, or first, side, or base, connecting to the upper portion 202 of the element 206. In the embodiment in which the ED 200 is formed during compression molding of one of the workpieces (e.g., proximate workpiece $101^1$), and so is a contiguous part of that workpiece, the upper portion 202 of the element 206 includes the workpiece $101^1$. The sides extend from the base to a point opposite the upper portion 202.

Importantly, the ED elements 206 do not all have the same characteristics. In one embodiment, at least one characteristic differing amongst at least some of the ED elements 206 is a height 212 of the elements. Benefits of this feature are described further below in connection with the welding sub-process of the method 400 of FIG. 4.

Generally, the benefits relate to an advantageous channeling of welding energy—e.g., ultrasonic vibrations—through primary ED elements initially, while passing less or not at all through secondary ED elements, in an early stage of welding, and through the secondary elements, while passing less or not at all through the primary ED elements in a subsequent stage of the welding.

FIG. 3 shows a side view of any of the ED elements 206 of FIG. 2. Along with the height 212 indicated in FIG. 2, FIG. 3 shows that the ED elements 206 can be defined by other features, such as width 302.

While the ED elements 206 can have other widths 302 without departing from the scope of the present technology, in one embodiment each ED element 206 has a width 302 between about 1.0 mm and about 4.0 mm. In one embodiment, the width 302 can be smaller, such as down to about 0.2 mm, and still possibly up to about 4.0 mm.

Continuing with the triangular embodiment of FIGS. 2 and 3, FIG. 3 shows a vertical side length 304 as another size characteristic of the ED director.

In one embodiment, a ratio of the height 212 to the width 302 (H/W) is between about 0.3 and about 1.0.

In one embodiment, each primary element $206^1$ of the elements 206 has a height of between about 0.5 mm and about 6.0 mm, and each secondary element $206^2$ has a height between about 0.4 mm and about 4.0 mm.

The ED elements 206 can have any appropriate thickness, and, related, any desired three-dimensional shape, and each element can have any desired size—e.g., thickness or thicknesses. The elements 206 can have a generally pyramid shape. For ED elements having rounded sides, the three-dimensional shape can be prismatic (e.g., rectangular or triangular prism), cylindrical, conical, frustoconical, pyramid (e.g., triangle pyramid, or tetrahedron), partial sphere (e.g., semi-sphere, demi-sphere, or hemisphere), etc. ED elements 206 can have straight and/or curbed sides.

As mentioned, the ED elements 206 do not all have the same characteristics. In a contemplated embodiment, along with or instead of varying heights, not every one of the ED elements 206 on a single energy director 200 has the same shape. Again, as with varying heights, benefits of varying the shape amongst the ED elements 206 are described further below in connection with the welding sub-process of the method 400 of FIG. 4. And again, generally, the benefits relate to an advantageous channeling of welding energy—e.g., ultrasonic vibrations—through primary ED elements initially, while passing less or not at all through secondary ED elements, in an early stage of welding, and through the secondary elements, while passing less or not at all through the primary ED elements in a subsequent stage of the welding.

II.C. Algorithm and Method of Operation—FIGS. 4-11

Now turning to the fourth figure, FIG. 4 shows an exemplary algorithm, by way of a flow chart 400, defining a method for (a) locating an energy director, such as the energy director 200 of FIG. 2, and (b) welding workpieces together by applying welding energy to a proximate workpiece at the identified location so that it channels through, and melts, the novel energy director as desired. The result is effective and efficient welding, and a more accurate and robust weld formed with less overall cycle time, energy, and energy-director material as compared to traditional techniques.

In some embodiments, the algorithm controls only some aspects of the method, such as the sub-process associated in FIG. 4 with reference numeral 406. In another, it controls operations 406 and 408, and in another operations 404, 406, 408, and 410, for example. The operations are described further below, in turn.

While joining two workpieces is described primarily herein, the number is presented as an example, and more than two pieces may be joined according to the teachings of the present disclosure.

It should be understood that the steps of the method 400 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. And it should also be understood that the illustrated method 400 can be ended at any time.

In certain embodiments, some or all steps of this process, and/or substantially equivalent steps are performed by, or at least initiated by a computing device, such as a processor executing computer-executable instructions stored or included at a computer-readable medium. And any one or more steps of the process can be performed, initiated, or otherwise facilitated by automated machinery, such as robotics.

The method 400 outlined by the flow chart of FIG. 4 is described now with additional reference to the tools and components of FIGS. 5-10. Characteristics of the elements shown, e.g., shape, size, and number, are presented to facilitate the present description and not to limit scope of the present technology.

The method 400 begins 401 and flow proceeds to block 402, whereat an energy director, such as the director 206 shown in FIG. 2, is positioned between the workpieces. FIG. 5 shows an example positioning of the energy director between adjacent workpieces.

In a contemplated embodiment, the energy director is formed in a sub-process of molding at least one of the workpieces. For instance, a mold in which the first workpiece is compression molded can include recesses and/or protrusions configured (e.g., sized and shaped) to form the energy director at a desired location of the workpiece.

As provided, the workpieces being welded together can be similar or dissimilar. Regarding dissimilar workpiece materials, one workpiece can be a plastic or other polymer, for instance, and the other can be steel, aluminum, an alloy, or other metal, etc. Thus, the teachings of the present disclosure can be used to join a polymer (e.g., polymer composite) to another polymer, or to join a polymer to a metal, for instance.

In one embodiment, the material includes polyethylene. In one embodiment, the material includes polyethylene terephthalate (PET), high density polyethylene (HDPE) and/or ethylene vinyl alcohol (EVOH).

In one embodiment, at least one of the workpieces being joined includes a polymer. At least one of the workpieces can include synthetic, or inorganic, molecules. While use of so-called biopolymers (or, green polymers) is increasing, petroleum based polymers are still much more common.

Material of one or both workpieces may also include recycled material, such as a polybutylene terephthalate (PBT) polymer, which is about eighty-five percent post-consumer polyethylene terephthalate (PET).

In one embodiment one or both of the workpieces includes some sort of plastic. In one embodiment, the material includes a thermo-plastic.

In one embodiment one or both of the workpieces includes a composite. For example, in one embodiment one or both of the workpieces includes a fiber-reinforced polymer (FRP) composite, such as a carbon-fiber-reinforced polymer (CFRP), or a glass-fiber-reinforced polymer (GFRP). The composite may be a fiberglass composite, for instance. In one embodiment, the FRP composite is a hybrid plastic-metal composite.

The material in some implementations includes a polyamide-grade polymer, which can be referred to generally as a polyamide.

Material of one or both workpieces may also include includes polyvinyl chloride (PVC).

In one embodiment, the material includes acrylonitrile-butadiene-styrene (ABS).

In one embodiment, the material includes a polycarbonate (PC).

Material of one or both workpieces may also comprise a type of resin. Example resins include a fiberglass polypropylene (PP) resin, a PC/PBT resin, and a PC/ABS resin.

The workpieces may be pre-processed, such as heated and compression molded prior to the welding.

In most manufacturing processes, more than one weld will made to connect two adjacent workpieces. The positioning of step 402 can thus include positioning multiple energy devices between the workpieces.

With continued reference to FIG. 4, with the energy director(s) positioned between the workpieces, flow proceeds to step 404 whereat the arrangement is positioned adjacent the weld system. This operation can include moving the workpiece/ED arrangement toward the welding system, and or moving aspects or an entirety of the welding system toward the arrangement.

The initial, coarse, positioning of step 404 can include positioning an ultrasonic horn of the system close to an estimated or believed location of the energy director to be used in the first weld.

Flow proceeds to the fine energy-director locating sub-process, or routine 406. As shown in FIG. 4, the locating routine 406 includes multiple sub-steps, distinguished by superscripts—i.e., 406$^{1-5}$. From step 404, the method turns particularly to the first routine step 406$^1$ whereat the welding head, or horn (e.g., ultrasonic servo horn, like the sonotrode tip of the example of FIG. 1) is lowered. The horn is lowered toward the proximate workpiece—i.e., the workpiece closest to the horn, such as in FIGS. 1 and 5.

The descending is illustrated in FIG. 6. The coarse positioning of step 404 does not usually position the horn directly over the energy director. Instead the horn usually ends up initially positioned only partially over the energy director, as indicated by path 604 in FIG. 6, or not over the director at all, as indicated by path 602 in FIG. 6. The target path is the third 606, which is reached by one or more iterations of the routine 406$^{1-5}$, as further described below.

The descending operation 406$^1$ is performed under the operation of a controller connected directly or indirectly to the welding horn. Features of an example controller is shown in FIG. 11, and described further below. The controller controls, e.g., a rate at which the horn is lowered toward the proximate workpiece. The controller can, for instance, control or be a part of a robotic apparatus, or robot, controlling movement of the welding horn.

At the next step 406$^2$ of the routine 406, the controller determines whether a push-back force being received at the weld horn from the workpiece, indicates that the horn has been lowered to a local terminal point. The controller determines this based on feedback (e.g., from a load cell) indicating a force, exerted by the workpiece 101$^1$, on the welding horn. The control receives the force indications from a sensor (not shown in detail) that may be part of, or connected to, the welding system, or part of, or connected to, automated robotic apparatus controlling movement of the welding horn.

If it is determined at step 406$^2$ that the horn has not reached its local terminal point, then flow of the algorithm returns back to the first routine step 406$^1$, as shown in FIG. 4. This will occur, for instance, while the horn is being lowered and had not yet contacted the workpiece. It will also occur when the horn has contacted the workpiece but not been lowered enough to receive a sufficient amount of push-back force from the workpiece.

When it is determined at step 406$^2$ that the horn has reached its local terminal point, then flow of the algorithm proceeds to step 406$^3$, whereat the controller determines a displacement that the horn traveled in order to reach the point, or otherwise determines a location of the terminal point—e.g., a vertical distance from any reference frame. The displacement can be determined by, e.g., an encoder connected directly or indirectly to the horn. In one embodiment, the system is configured to take horn displacement measurements continually, at short intervals, or otherwise quickly as the horn descends. The system is further configured to compare the regular displacement values determined with a target displacement value continuously or at short regular intervals or otherwise quickly as the horn descends.

At step 406$^4$, the controller determines whether the displacement, or vertical position, of the horn corresponding to the local terminal point is indicative of the horn having been lowered to a target location of the workpiece arrangement—i.e., the location of the arrangement having the energy director between the workpieces and directly, fully, below the welding horn.

The controller is programmed, or calibrated, with data identifying values, or ranges, of horn displacements, or positions, corresponding to expected, or likely, positions of the horn with respect to the target location of the workpiece arrangement. The data indicates, for instance, that the horn will be at a predetermined vertical position, within an error window, or range, when the horn has contacted the target position, because the horn will be opposed by the threshold force earlier.

This is because the workpiece arrangement is thicker where the energy director is, or at least the top workpiece will not give as much to the horn when the energy director is there. When the horn pushes on a location of the workpiece that is not over the energy director, the horn is able to push down farther on the workpiece before the horn finally experiences the threshold push-back force. The data indicates, based on the horn displacement to the threshold force, where the horn is—e.g., over or not over the energy director, can be generated in lab testing, for instance. The data can also provide an indication, based on the horn displacement to the threshold force, of how far the horn is from the energy director.

This concept is described further with reference to FIGS. 6 and 7.

As referenced, FIG. 6 shows three example paths 602, 604, 606. At a first lateral position over the proximate workpiece $101^1$, the horn descends along the first example path 602. Because the energy director 200 is nowhere near a line of the path 602, when the horn contacts the workpiece $101^1$, the workpiece, not being restricted by any energy director, there, will give, or displace more than it would if the director were there. The horn is thus able to move farther downward before the predetermined threshold force, from the workpiece $101^1$, opposes the horn's downward movement.

FIG. 7 is a graphical representation corresponding to the three paths shown in FIG. 6. More particularly, FIG. 7 shows a graph 700 having an y-axis 702 representing welding horn displacement and an x-axis 704 indicating horn lateral, or orthogonal, position. The first bar 706 corresponds to the first path 602 of FIG. 6. Accordingly, the displacement is very high because the path 602 is not over, and not relatively near to, the energy director 200 in FIG. 6.

The second bar 708 in FIG. 7 corresponds to the second path 604 of FIG. 6. Accordingly, the displacement is lower, but still not as low as it should be because the path 606 is still not directly and completely over the energy director 200. In some embodiments, the energy director is not rigid, and rather has some flexibility. The horn thus is opposed by less force when lowered on a portion of the workpiece $101^1$ that is not completely over the energy director (e.g., the second path 604), because less of the director is acting to resist the downward movement of the horn. When the horn is lowered directly over the horn (e.g., the third path 606), more (i.e., all) of the energy director is beneath the workpiece where the horn is lowered, and so more of the director opposes the downward movement of the horn, and the workpiece thus displaces less before experiencing the threshold feed-back force.

The third bar 710 in FIG. 7 corresponds to the third path 606 of FIG. 6. Accordingly, the displacement is relatively low because the path 606 is directly over the energy director 200, which limits the horn from descending further.

With continued reference to FIG. 4, assuming the welding horn is, in a first iteration of the routine 406, at a first lateral position corresponding to the first path 602, then at step $406^3$, the controller would determine that the horn has displaced a relatively-large amount to reach the termination point—e.g., the first relatively-large displacement 706.

At the next step $406^4$, the controller determines whether the displacement (e.g., displacement 706 corresponding to the first path 602) indicates that that horn is directly over the energy director. Because the displacement is relatively high in this first iteration (e.g., displacement 706), the controller, based on the pre-programmed data (e.g., from previous lab testing) concludes that the horn is not directly over the director. Thus, from the decision $406^4$, flow of the algorithm continues to step $406^5$ whereat the controller determines a next lateral location to move the horn to for a next descent and measuring.

Determining, in step $406^5$, where the horn should be moved for the next horn drop, in one embodiment includes consideration of the displacement determined in the last step $406^4$. For instance, if the last displacement (e.g., displacement 706) is very high, then the lateral distance to move the horn for the next drop would be greater. If the last displacement is low—e.g., very close to what it would be if the horn was directly over the energy director, then the later distance, to move the horn for the net drop, would be much less.

Following repositioning of the horn at step $406^5$, steps $406^1$ to $406^5$ are repeated.

Once the iteration results at step $406^4$ with a horn displacement at or below a threshold, or target displacement, then the controller concludes that the horn has been lowered directly over the energy director. With reference to FIGS. 6 and 7, for instance, when the horn is lowered along the third path 606 of FIG. 6, the horn will only travel a minimal displacement 710, being below a threshold displacement 712 also indicated in FIG. 7. The displacement values at or below the threshold displacement 712 can be referred to as a displacement tolerance range.

In response to determining, at $406^4$ that the horn moved only a target displacement (e.g., 710) to reach the threshold push-back force, and so that the horn was lowered onto the workpiece $101^1$ directly over the workpiece, then flow of the algorithm proceeds from the energy-director-locating routine 406 to welding step 408.

At step 408, welding energy is applied from the to the proximate work piece $101^1$ at the determined location, directly above the energy director. For ultrasonic welding, the energy includes high-frequency ultrasonic vibrations excited and passing from the welding horn.

As described above, the energy director is designed so that the welding energy passes initially more or completely through some of the energy-director (ED) elements (206) than others. For instance, in the multi-height embodiments, the energy would pass through the taller ED elements $206^1$ initially, and not through the shorter elements $206^2$, because the taller elements contact the distal workpiece $101^2$ creating a path between the workpieces $101^1$, $101^2$. The energy would not flow freely through the shorter ED elements at this point because the shorter elements do not touch the distal piece $101^2$, and so there is not path through the shorter elements to the distal piece $101^2$ for the energy.

With the welding energy passing through the taller ED elements $101^1$, the taller elements are melted first, as well as the workpieces adjacent the taller elements. This stage is shown in FIG. 8.

Regarding the welding operation, more particularly, for ultrasonic welding, heat is generated from intermolecular friction at and between the energy directors and the workpieces where the welding energy (e.g., HF vibrations) are passing. The heat causes the director and workpieces to melt, creating the joining weld.

The arrangement is under some compression, at least due to the weight of the proximate workpiece $101^1$, and by downward force of the horn. In some embodiments, the horn is configured (e.g., spring loaded) and/or controlled to apply a downward force on the proximate piece $101^1$ during welding. Thus, as the ED elements melt, the top workpiece $101^1$ lowers.

After the taller elements are melted further, a subsequent stage, shown in FIG. 9, is reached whereby the taller ED elements $206^1$ have melted sufficiently for the shorter ED elements $206^2$ to contact the distal workpiece $101^2$.

At this point, because the taller ED elements $206^1$ have been at least partially melted, and the shorter ED elements $206^2$ have not yet been melted and not contact the lower workpiece $101^2$, the shorter ED elements $206^2$ now present a lower-resistance path for the welding energy (e.g., HF vibrations) than the taller ED elements $206^1$.

Thus, from the stage shown in FIG. 9 of the welding sub-process 408, the welding energy channels mostly, or at least more, through the shorter elements, melting them and the workpieces $101^1$, $101^2$ adjacent the shorter elements.

Upon solidification, the melted portions form weld nuggets between the workpieces, and these welds will hold the workpieces $101^1$, $101^2$ together. For embodiments in which a generally annular energy director is used (e.g., the director 206 of FIG. 2), the resulting weld can be generally annular, likewise. An example weld is shown in FIG. 10 (the weld is shown without the workpieces 1011, $101^2$ that the weld holds together).

As provided, it has been found that an annular weld can be as strong as continuous welds (i.e., welds not having a central void). More specifically, a predominant amount of the holding force created by a solid or continuous weld is provided by an outer annual portion of the weld, with a central portion of the weld contributing little holding force in comparison. A weld lacking the central portion, thus, can be formed with less energy than a continuous weld (one lacking a central void), and perhaps less time, without sacrificing joint strength.

After a pre-set amount of time, application of welding energy is ceased, and the horn retrieved from the proximate workpiece $101^1$. The system is pre-programmed with the amount of time to apply the welding energy. The timing can be determined in lab testing, for instance.

With final reference to FIG. 4, at step 410, the controller determines whether there are any other welds to make. If so, then flow returns to step 404 whereat the horn is repositioned for locating a next energy director in the locating routine 406. Once the next energy director is located, flow proceeds again to the welding operation 408, and so on.

While two ED element heights are disclosed, in a contemplated embodiment, the energy director includes more than two heights, and so a corresponding number of welding stages greater than two.

As referenced above, instead of or along with height difference between ED elements 206, the elements can have shape difference controlling where and when the welding energy is channeled, thereby controlling what parts of the energy director melt in a first stage and which in a second stage. While two ED shapes are presented as a primarily example, here, more than two ED shapes is possible, and so a corresponding number of welding stages.

While two primary welding stages are described—e.g., a first stage during which the taller ED elements $206^1$ channel the weld energy and melt, and a second stage during which the shorter ED elements $206^2$ channel the weld energy and melt. As referenced, while the energy transfers through the shorter element more in the second stage, energy may still transfer, to a lesser degree, through the taller elements since they are still intact between the workpieces $101^1$, $101^2$.

The present welding technique 408 results in the ED elements, tall and then short, melting progressively, at a desired time interval.

The technique 408 also allows use of less energy to perform the welding than would be required if the energy director was solid with no ED elements, or if every ED element was the same height and shape. For instance, if the energy director had ten (10) equal ED elements, energy sufficient to channel the energy through all ten elements simultaneously would be needed throughout one long, single stage. If the energy director, though, included five taller ED elements and five shorter ED elements, then in the first stage, only energy sufficient to channel the energy through the five taller elements is needed, that energy level being less than the energy level of the previous example in which the energy had to be channeled through all ten equal ED elements. In the second stage, generally, only energy sufficient to channel the energy through the five smaller elements is mostly needed, that energy level also being less than the energy level of the previous example in which the energy had to be channeled through all ten equal ED elements. In theory, further, a sum of the first-stage and second-stage energy application is less than the total energy that would be required for the arrangement having the ten identical ED elements.

II.D. Example Controller—FIG. 11

FIG. 11 illustrates schematically features of an example controller, such as computing device. The controller is indicated in FIG. 11 by reference numeral 1100. As provided, the controller 1100 can control or be part of a robotic apparatus 1102.

As shown, the controller 1100 includes a memory, or computer-readable medium 1104, such as volatile medium, non-volatile medium, removable medium, and non-removable medium. The term computer-readable media and variants thereof, as used in the specification and claims, refer to tangible, non-transitory, storage media.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The controller 1100 also includes a computer processor 1106 connected or connectable to the computer-readable medium 1104 by way of a communication link 1108, such as a computer bus.

The computer-readable medium 1104 includes computer-executable instructions 1110. The computer-executable instructions 1110 are executable by the processor 1106 to cause the processor, and thus the controller 1100, to perform any combination of the functions described in the present disclosure. These functions are described, in part, above in connection with FIG. 4, and supporting illustrations of FIGS. 1-3 and 5-10.

In a contemplated embodiment, the controller is in communication with one or more remote devices 1112. For instance, a central computer or service in the manufacturing plant can communicate with the controller 1100, such as to provide instructions to and/or receive feedback (e.g., operations reports) from the controller 1100.

The computer processor 1106 is also connected or connectable to at least one interface 1112 for facilitating communications, between the controller 1100 and any other local components 1114, such as, for instance, sensor devices like the force sensors referenced above.

The interface 1112 can also be configured to facilitated communications with any remote device 1116.

For communicating with the local components 1114, the interface 1112 can include one or both of wired connections and wireless components—e.g., transceiver, transmitter, and/or receiver.

For communicating with the remote components 1116, the interface 1112 includes one or both of a short-range transceiver (or transmitter and/or receiver) and a long-range transceiver (or transmitter and/or receiver).

The remote components 1116 can include databases, servers, other processors, other storage mediums, and/or other computing devices, such as other systems in a manufacturing plant communicating instructions to and/or receiving data from (e.g., performance reports) the controller 1100.

Although shown as being a part of the controller 1100, completely, the interface 1112, or any aspect(s) thereof, can be partially or completely a part of the controller 1100. The interface 1112, or any aspect(s) thereof, can be partially or completely external to and connected or connectable to the controller 1100.

III. ADVANTAGES OF IMPLEMENTATION

A benefit of the present technology is energy savings, as less energy is needed to locate the energy directors.

Time is also saved, as less time is used locating energy directors.

Such efficient, effective, and robust processes of the welding process support increased use of polymeric components needing to be joined to similar materials (e.g., polymeric composite/polymeric composite connection) or dissimilar materials (e.g., a polymeric/metal connection, etc.). Related benefits of using such materials, including weight reduction, performance enhancements, and corrosion resistance follow.

IV. CONCLUSION

The law does not require and it is economically prohibitive to illustrate and teach every possible embodiment of the present technology foci (e.g., claims). Hence, the above-described embodiments are merely exemplary illustrations of implementations set forth for a clear understanding of the principles of the disclosure. Variations, modifications, and combinations may be made to the above-described embodiments without departing from the scope of the technology foci (e.g., claims). All such variations, modifications, and combinations are included herein by the scope of this disclosure and the following technology foci (e.g., claims).

What is claimed:

1. A process, for changing relative positioning between a welding assembly and a workpiece arrangement using a locating implement of the welding assembly so a welding head is directly adjacent a welding energy director of the welding assembly, for effective welding together of multiple workpieces, of the workpiece arrangement, at an area of the energy director, comprising:
   positioning the workpiece arrangement in preparation to make one or more approaches, for locating the energy director, wherein the workpiece arrangement includes a proximate workpiece, a distal workpiece, and the welding energy director positioned therebetween; and
   performing, under control of a controller, a locating sub-routine comprising:
   moving, in by a first approach movement, in a first direction, along a first path, (a) the locating implement of the welding assembly toward the proximate workpiece, being closest to the implement, or (b) the proximate workpiece toward the locating implement, so that the locating implement contacts a first location of a surface of the proximate workpiece, the first location of the proximate workpiece not being directly adjacent the welding energy director;
   determining, in a first location determination, a first distance of displacement of the proximate workpiece in response to contact with the proximate workpiece, the first distance of displacement being captured at a position where the locating implement perceives a predetermined threshold force in response to contact with the proximate workpiece, wherein the first distance of displacement would indicate that the locating implement has been lowered to a target welding-energy-director point;
   relocating, in response to a negative result from the first location determination, indicating that the first approach movement mislocated the locating implement along the surface of the proximate workpiece, the locating implement or the proximate workpiece by a subsequent approach movement, in a second direction, along a second path, so that the locating implement contacts a second location of the surface of the proximate workpiece, distinct from the first location of the proximate workpiece, the second location of the proximate workpiece being directly adjacent the welding energy director;
   determining, in a second location determination, a second distance of displacement of the proximate workpiece in response to contact with the proximate workpiece, being less than the first distance of displacement, the second distance of displacement being captured at a position where the locating implement perceives the predetermined threshold force, wherein the second distance of displacement indicates that the locating implement, being positioned at the second location, has been positioned at the target welding-energy-director point; and
   determining, in response to a positive result from the second location determination, to first commence application of welding energy at the target welding-energy-director point to which the locating implement was accurately moved after being determined mislocated, to join the distal workpiece and the proximate workpiece at the target welding-energy-director.

2. The process of claim 1, further comprising positioning the energy director adjacent the area prior to the locating sub-routine.

3. The process of claim 2, wherein positioning the energy director includes forming the energy director with the proximate workpiece in a compression molding process for the first workpiece.

4. The process of claim 1, wherein the locating implement includes or is part of a welding horn to be used to apply welding energy, at the target welding-energy-director point to which the locating implement was accurately moved, to weld the workpieces together.

5. The process of claim 1, wherein the moving includes moving the locating implement and/or the proximate workpiece with consideration to an estimated or known location of the energy director, so that the locating implement is relatively close to the target welding-energy-director point in response to the first approach movement.

6. The process of claim 1, wherein:
the first location determination comprises the controller determining that the first distance of displacement causes the locating implement to move; and
determining, in the second location determination, whether the second distance of displacement indicates that the locating implement has been positioned at the target welding-energy-director point, comprises comparing the second distance of displacement to a pre-established threshold displacement value.

7. The process of claim 6, wherein:
the energy director is flexible; and
the threshold displacement value corresponds to a predetermined level of force reached when the locating implement is pushing against the energy director so that the energy director deforms to a point at which it pushes back at the predetermined level.

8. The process of claim 1, wherein the energy director is a multi-height director, including first energy-directing elements having a first height and second energy-directing elements having a second height distinct from the first height.

9. The process of claim 8, wherein the elements are configured to channel welding energy through the energy director in a pre-determined manner.

10. The process of claim 9, wherein the predetermined manner includes channeling the energy through the primary elements in an initial stage of welding, while passing none through secondary elements in the initial stage.

11. The process of claim 10, wherein the predetermined manner includes channeling the energy through the secondary elements in a subsequent stage of the welding.

12. The process of claim 11, wherein little to no energy is passed through the primary elements in the subsequent stage.

13. The process of claim 1, wherein:
the energy director is a first energy director;
the process is for positioning the locating implement, accurately by multiple approach attempts, directly adjacent multiple energy directors, including the first energy director; and
the locating sub-routine is performed once for each of the multiple energy directors.

14. A process, for changing relative positioning between a welding assembly and a workpiece arrangement using a locating implement of the welding assembly so a welding head is directly adjacent a welding energy director of the workpiece arrangement, for effective welding together of multiple workpieces, of the workpiece arrangement, at an area of the energy director, the workpiece arrangement comprising the welding energy director, a proximate workpiece of the multiple workpieces, and a distal workpiece of the multiple workpieces with the welding energy director positioned therebetween, the process comprising:
performing, under control of a controller, a locating sub-routine comprising:
moving, in by a first approach movement, in a first direction, along a first path, (a) the locating implement of the welding assembly toward the proximate workpiece, being closest to the implement, or (b) the proximate workpiece toward the locating implement, so that the locating implement contacts a first location of a surface of the proximate workpiece, the first location of the proximate workpiece not being directly adjacent the welding energy director;
determining, in a first location determination, a first distance of displacement of the proximate workpiece in response to contact with the proximate workpiece, the first distance of displacement being captured at a position where the locating implement perceives a predetermined threshold force in response to contact with the proximate workpiece, wherein the first distance of displacement would indicate that the locating implement has been lowered to a target welding-energy-director point;
relocating, in response to a negative result from the first location determination, indicating that the first approach movement mislocated the locating implement along the surface of the proximate workpiece, the locating implement or the proximate workpiece by a subsequent approach movement, in a second direction, along a second path, so that the locating implement contacts a second location of the surface of the proximate workpiece, distinct from the first location of the proximate workpiece, the second location of the proximate workpiece being directly adjacent the welding energy director;
determining, in a second location determination, a second distance of displacement of the proximate workpiece in response to contact with the proximate workpiece, being less than the first distance of displacement, the second distance of displacement being captured at a position where the locating implement perceives the predetermined threshold force, wherein the second distance of displacement indicates that the locating implement, being positioned at the second location, has been positioned at the target welding-energy-director point; and
determining, in response to a positive result from the second location determination, to first commence application of welding energy at the target welding-energy-director point to which the locating implement was accurately moved after being determined mislocated, to join the distal workpiece and the proximate workpiece at the target welding-energy-director point.

15. The process of claim 14, wherein the locating implement includes or is part of a welding horn to be used to apply welding energy, at the target welding-energy-director point to which the locating implement was accurately moved, to weld the workpieces together.

16. The process of claim 14, wherein the moving includes moving the locating implement and/or the proximate with consideration to an estimated or known location of the energy director, so that the locating implement is relatively close to the target welding-energy-director point in response to the first approach movement.

17. The process of claim 14, wherein:
the first location determination comprises the controller determining that the first distance of displacement causes the locating implement to move; and
determining, in the second location determination, whether the second distance of displacement indicates that the locating implement has been positioned at the target welding-energy-director point, comprises comparing the second distance of displacement to a pre-established threshold displacement value.

18. A system, for changing relative positioning between a welding assembly and a workpiece arrangement using a locating implement of the welding assembly so a welding head is directly adjacent a welding energy director of the workpiece arrangement, for effective welding together of multiple workpieces, of the workpiece arrangement, at an area of the energy director, the workpiece arrangement comprising the welding energy director, a proximate workpiece of the multiple workpieces, and a distal workpiece of the multiple workpieces with the welding energy director positioned therebetween, the system comprising:
- a hardware-based processing unit; and
- a non-transitory computer-readable storage device comprising locating sub-routine instructions that, when executed by the hardware-based processing unit:
  - moving, in by a first approach movement, in a first direction, along a first path, (a) the locating implement of the welding assembly toward the proximate workpiece, being closest to the implement, or (b) the proximate workpiece toward the locating implement, so that the locating implement contacts a first location of a surface of the proximate workpiece, the first location of the proximate workpiece not being directly adjacent the welding energy director;
  - determining, in a first location determination, a first distance of displacement of the proximate workpiece in response to contact with the proximate workpiece, the first distance of displacement being captured at a position where the locating implement perceives a predetermined threshold force in response to contact with the proximate workpiece, wherein the first distance of displacement would indicate that the locating implement has been lowered to a target welding-energy-director point;
  - relocating, in response to a negative result from the first location determination, indicating that the first approach movement mislocated the locating implement along the surface of the proximate workpiece, the locating implement or the proximate workpiece by a subsequent approach movement, in a second direction, along a second path, so that the locating implement contacts a second location of the surface of the proximate workpiece, distinct from the first location of the proximate workpiece, the second location of the proximate workpiece being directly adjacent the welding energy director;
  - determining, in a second location determination, a second distance of displacement of the proximate workpiece in response to contact with the proximate workpiece, being less than the first distance of displacement, the second distance of displacement being captured at a position where the locating implement perceives the predetermined threshold force, wherein the second distance of displacement indicates that the locating implement, being positioned at the second location, has been positioned at the target welding-energy-director point; and
  - determining, in response to a positive result from the second location determination, to first commence application of welding energy at the target welding-energy-director point to which the locating implement was accurately moved after being determined mislocated, to join the distal workpiece and the proximate workpiece at the target welding-energy-director point.

19. The process of claim 17, wherein:
the energy director is flexible; and
the threshold displacement value corresponds to a predetermined level of force reached when the locating implement is pushing against the energy director so that the energy director deforms to a point at which it pushes back at the predetermined level.

* * * * *